United States Patent [19]
Kuenen

[11] Patent Number: 6,095,805
[45] Date of Patent: Aug. 1, 2000

[54] STEAM OVEN

[75] Inventor: Hendrikus Antonius Jacobus Kuenen, Overloon, Netherlands

[73] Assignee: Koppens Convenience Food Systems, Bakel, Netherlands

[21] Appl. No.: 09/035,150

[22] Filed: Mar. 5, 1998

[30] Foreign Application Priority Data

Apr. 11, 1997 [NL] Netherlands .......................... 1005803

[51] Int. Cl.[7] ..................................... A23L 3/04
[52] U.S. Cl. ........................... 432/144; 99/443 R; 99/478
[58] Field of Search .................................. 432/144, 145, 432/152; 99/443 C, 443 R, 477, 478; 219/388, 401; 126/20, 20.1; 34/201, 209, 217, 224

[56] References Cited

U.S. PATENT DOCUMENTS

| | | | |
|---|---|---|---|
| 4,118,181 | 10/1978 | Onodera . | |
| 4,191,881 | 3/1980 | Ahlgren et al. | 219/388 |
| 4,514,167 | 4/1985 | Royer | 432/152 |
| 4,792,303 | 12/1988 | Stewart et al. | 432/72 |
| 5,078,120 | 1/1992 | Hwang | 126/21 A |
| 5,243,962 | 9/1993 | Hwang | 99/443 C |
| 5,329,916 | 7/1994 | Lygum | 126/20.1 |
| 5,407,692 | 4/1995 | Caridis et al. . | |
| 5,850,781 | 12/1998 | Kuenen | 99/443 C |

FOREIGN PATENT DOCUMENTS 558 151  9/1993  European Pat. Off. .
1 414 942  9/1965  France .

*Primary Examiner*—Denise L. Ferensic
*Assistant Examiner*—Gregory A. Wilson
*Attorney, Agent, or Firm*—Sughrue, Mion, Zinn, Macpeak & Seas, PLLC

[57] ABSTRACT

An oven includes a housing provided with a device for supplying steam into the interior of the housing, in connection with the setting of a cooking condition, such as the temperature and/or relative humidity, and also a conveyor belt which passes through the housing and on which food products to be heated can be accommodated. The conveyor belt passes through at least one path with one or more windings disposed above one another. The device for supplying steam has at least one steam outlet for delivering steam at the level of the radially innermost part of a winding.

16 Claims, 3 Drawing Sheets

STEAM OVEN

BACKGROUND OF THE INVENTION

The invention relates to an oven, comprising a housing provided with means for supplying steam into the interior of said housing, in connection with the setting of a cooking condition, such as the temperature and/or relative humidity, and also a conveyor belt which runs through the housing and on which food products to be heated can be accommodated, which conveyor belt passes through at least one path with one or more windings above one another.

Such a steam oven is known. The cooking process in such an oven is brought about mainly by the fact that the steam supplied into the housing condenses on the products. This causes heat transfer to occur, in such a way that the products are cooked. In order to obtain a desired degree of cooking, the temperature and/or the humidity are measured and subsequently regulated and maintained by means of the steam injection.

The belt is usually coiled around the outside of a rotatable drum with vertical axis. The steam is supplied at a central point, for example in the flow channel placed behind a fan for circulating the steam atmosphere. This means that the steam enters on the outside of the windings and flows over the surface of the windings and the outermost products lying thereon to the inside of the windings, adjacent to the rotating drum.

The steam atmosphere delivers heat along its path over the windings, with the result that the products on the inside are served with a less warm mixture of steam and air than the products on the outside. The disadvantage of such uneven heating is that the outermost products are overcooked. The reason for this is that the core temperature of the products situated in the least warm zone must have reached a certain minimum. This generally results in weight loss or lower quality of the overcooked products, which in economic terms gives rise to a major loss item.

SUMMARY OF THE INVENTION

The object of the invention is to provide a steam oven which does not have these disadvantages. That object is achieved by the fact that the means for supplying steam have at least one outlet for delivering steam at the level of the radially innermost part of a winding.

The steam is supplied in the usual way to the outermost products on a winding; but the products lying further inwards have steam supplied directly at the correct temperature. As a result, all products on the belt are cooked very uniformly, so that no overheating of certain products need now occur.

At least one steam outlet is preferably situated at the innermost half of a winding, viewed in the breadthwise direction of the belt.

It must be possible to convey the products in the normal manner, lying on the belt, in other words, the additional supply of steam must not produce any obstacles. This is ensured in the case of an embodiment in which at least one steam outlet and the corresponding steam supply line are situated below a winding, at a distance above the winding situated directly below it. A steam outlet with corresponding steam supply line is preferably situated at the position of each winding. In this way uniform treatment can be ensured over the entire coiled path.

Each steam supply line can run essentially horizontally until outside the periphery of the windings and be connected to a vertical main line.

As already known, the oven can, of course, comprise at least one fan for generating a flow over the path with windings, which fan is connected to a supply channel extending over the top winding, in which supply channel at least one steam outlet is situated.

The supply channel can extend over half the path, the windings of that half being protected by a protective plate which follows the contour of the windings, in such a way that the flow from the outside over the windings is guided from the outlet of the supply channel to the fan, and each steam outlet is situated in the region of each winding near the outlet of the supply channel. The flow emerging from the supply channel thus takes the steam delivered directly by way of the additional steam outlet along with it to the innermost part of the appropriate winding of the conveyor belt, with the result that uniform heating is obtained.

Two supply channels are preferably provided, each connected to its own fan, each of which supply channels extends essentially symmetrically over half of the path, and both halves are protected by a protective plate, in such a way that each steam outlet is situated above the region of each winding situated between the two outlets of the two supply channels.

The additional steam supply according to the invention can be used in the case of all kinds of steam ovens. According to a first possibility, it can be an oven provided with a housing with at least two zones, each provided with means for supplying steam in connection with the setting of a cooking condition in the zone concerned, such as the temperature and/or relative humidity, and also a conveyor belt which passes through each of the zones and on which food products to be heated can be accommodated, which conveyor belt passes through at least one path with several windings above one another.

Each zone can in a known manner have at least one fan device for causing steam to circulate through that zone and parallel to the boundary region between two zones. A partition can be situated between two adjacent zones, which partition has a passage for the conveyor belt.

These two zones can be situated above each other; but, as an alternative, the two zones can also be situated next to each other.

Of course, the invention can also be used in an oven with only a single zone.

BRIEF DESCRIPTION OF THE DRAWINGS

The invention will be explained in greater detail below with reference to an exemplary embodiment shown in the figures.

DETAILED DESCRIPTION OF THE PREFERRED

Figure 1:
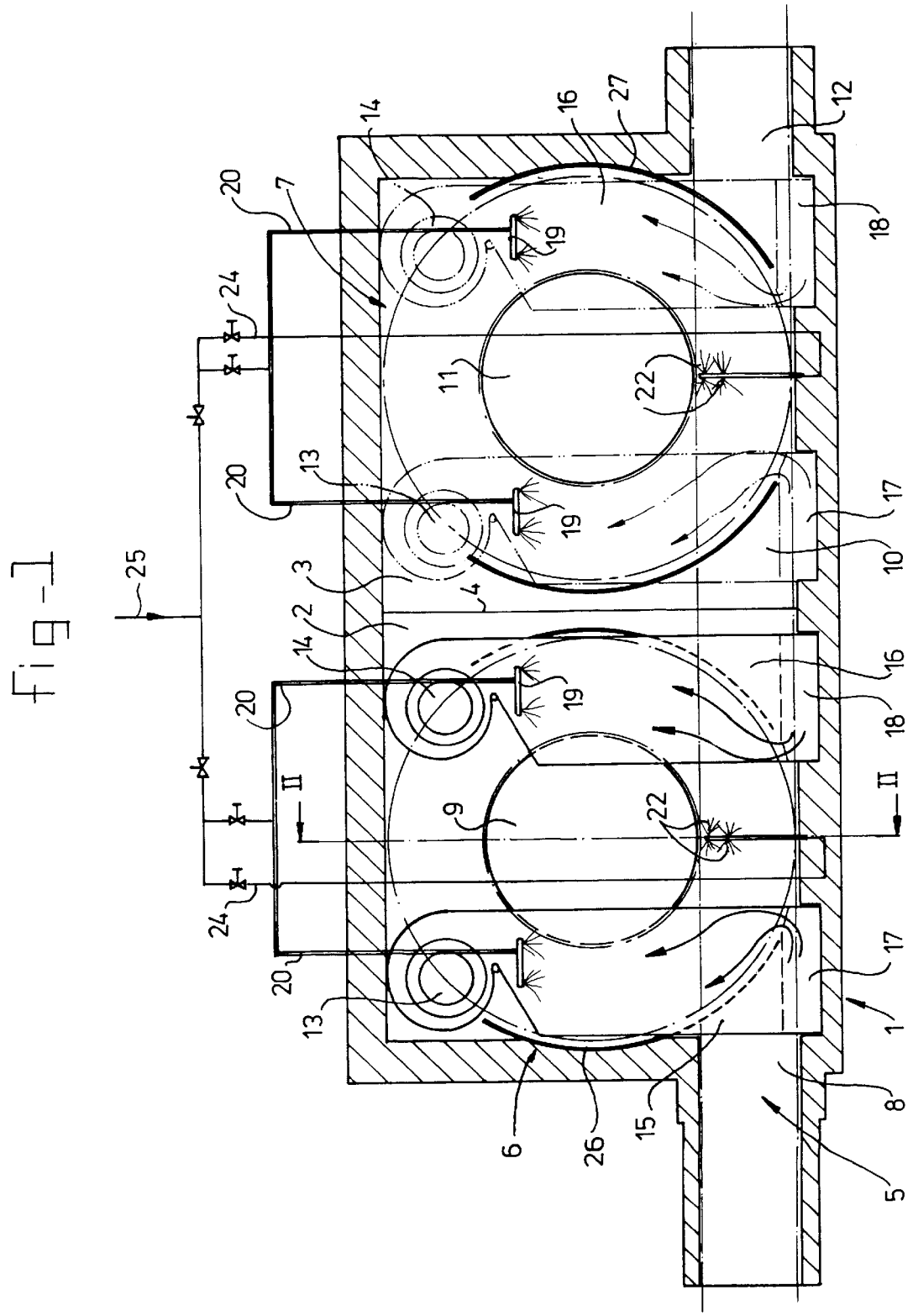
FIG. 1 shows a top view, partially in section and cut away, of the oven according to the invention.
Figure 2:
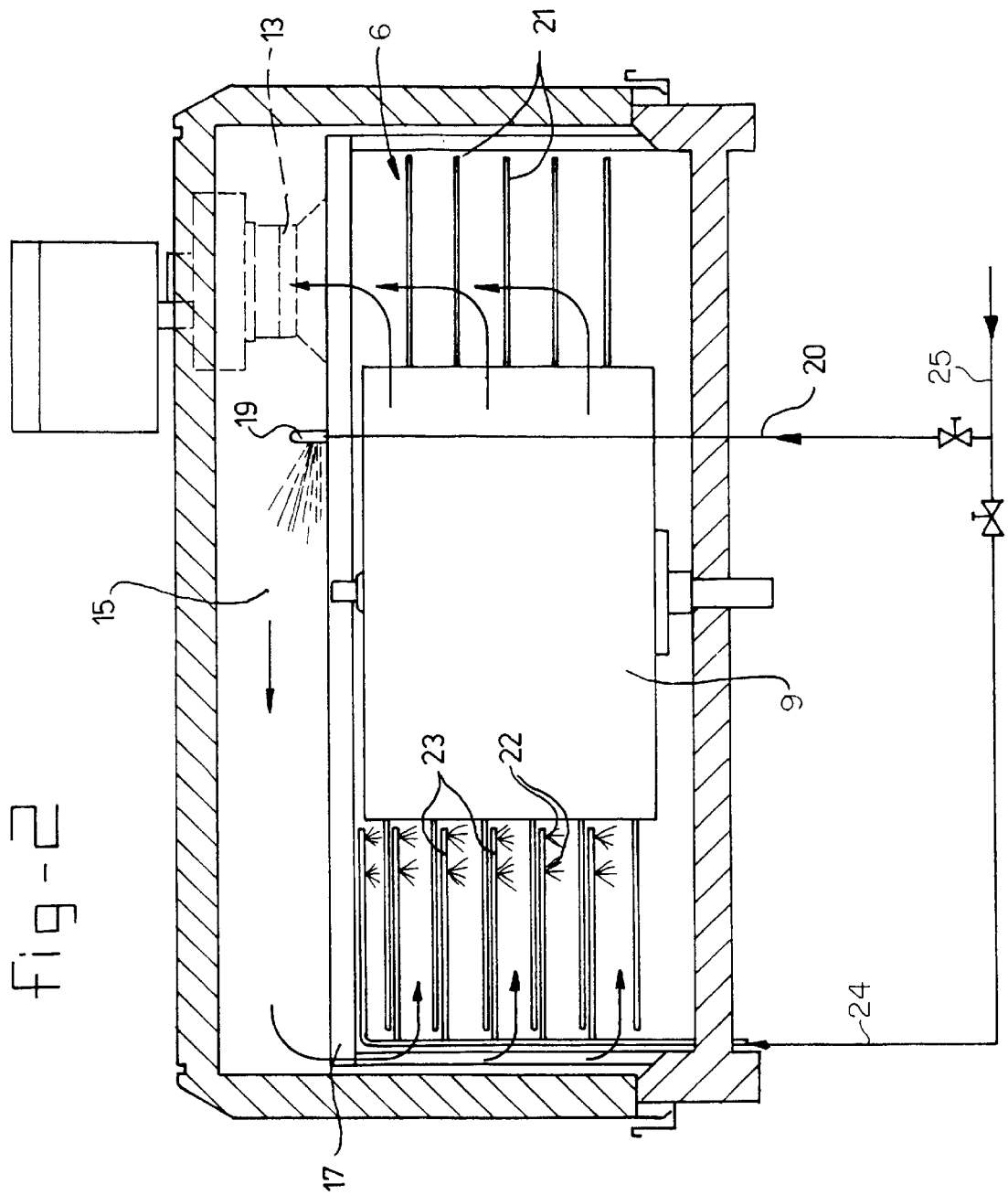
FIG. 2 shows a section along II—II of FIG. 1.
Figure 3:
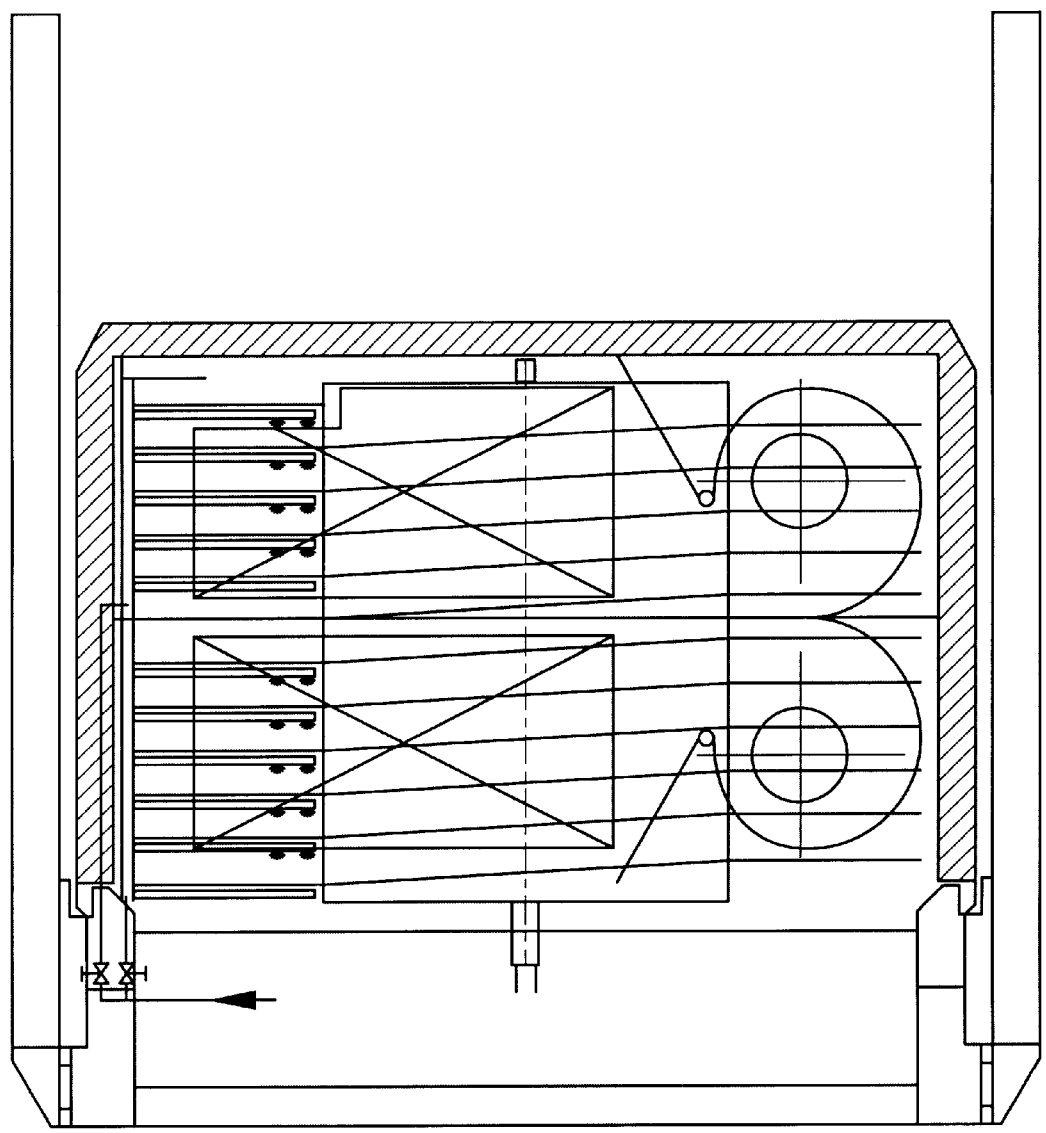
FIG. 3 shows an alternative embodiment of the invention.

The oven shown in FIGS. 1 and 2 comprises a housing which in this example consists of two zones 2, 3, separated by wall 4. Passing through the housing is the belt, indicated in its entirety by 5, which belt both in the one zone 2 and in the other zone 3 follows a helical path 6, 7 respectively. Alternatively, the two zones 2, 3 may be positioned vertically with respect to each other as shown in FIG. 3.

The belt enters the housing through opening 8, which gives access to zone 2. The belt then runs upwards in the helical path 6 around the outside of drum 9, after which by way of the belt part 10, which projects through an opening in the wall 4, it passes into the helical path 7, which runs downwards around drum 11. Finally, the belt leaves the housing at opening 12.

Two fans 13, 14 are fitted in the two zones 2, 3, which fans—as shown clearly in FIG. 2—extract the air from the zone concerned and supply it by way of supply channel 15, 16 to outlet 17, 18 respectively.

A nozzle 19 is fitted in a known manner in the supply channels 15, 16, which nozzle forms an outlet for the steam supplied through the line 20. By regulating the steam supply depending on sensors (not shown) which are known per se for measuring temperature and/or humidity, a certain desired steam atmosphere can be maintained in the zone 2, 3 concerned. These steam atmospheres can differ for each zone, in such a way that a certain desired course of the cooking process during passage through the housing 1 is obtained.

As can be seen in the top view of FIG. 1, the flow emerges from the outlets 17, 18, and in so doing runs first over the outer periphery of the windings forming the helical paths 6, 7. The result of that would be that the products lying on the outside of those windings become warmer than the products situated near the drums 9, 11.

In order still to heat the products uniformly in the breadthwise direction of the belt 5, according to the invention two nozzles 22 in each case are provided above each winding 21 (see FIG. 2), which nozzles form an outlet for the steam. These nozzles 22 are situated at the end of the horizontal steam supply pipes 23 which are in communication with the vertical steam supply pipe 24. Together with steam supply pipe 20, this vertical steam supply pipe 24 is connected to a central steam line 25. Also, the steam supply pipes 23 form part of a bearing structure 30 of the windings 21 of the belt 5.

The products situated on the inside of each winding, close up against the drums 9, 11, are thus additionally served separately through the nozzles 22 with steam at the correct temperature, with the result that those products also are cooked in the desired way and in the same manner as the products lying more towards the outside on the windings.

What is claimed is:

1. An oven comprising:
    a housing (1) provided with means of supplying steam into an interior of said housing, in connection with the setting of a cooking condition, such as the temperature and/or relative humidity, and
    a conveyor belt (5) which passes through the housing and on which food products to be heated can be accommodated,
    said conveyor belt passing through at least one path (6, 7) defining a plurality of windings (21) disposed above one another, said path (6, 7) being helically accommodated around a rotatable drum (9, 11), wherein the means for supplying steam has at least one steam outlet (22) for delivering steam at a radially innermost part of a winding so that the food products on an inside of said windings, close up to said drum (9, 11), are additionally served with steam.

2. An oven according to claim 1, in which at least one steam outlet is situated at the innermost half of a winding, viewed in a breadthwise direction of the belt.

3. An oven according to claim 1, in which at least one steam outlet (22) and a corresponding steam supply line (23) are situated below one winding, and spaced above another winding situated directly below said one winding.

4. An oven according to claim 3, in which a steam outlet with corresponding steam supply line is situated above or below each winding.

5. An oven according to claim 3, in which the steam supply line forms part of a bearing structure for the windings of the conveyor belt.

6. An oven according to claim 3, in which each steam supply line runs essentially horizontally until outside the periphery of the windings, and is the rest connected to a vertical main line (24).

7. An oven according to claim 1, comprising at least one fan (13, 14) for generating a flow over the path with windings, which fan is connected to a supply channel (15, 16) extending over the top winding, in which supply channel at least one steam outlet (19) is situated.

8. An oven according to claim 7, in which the supply channel extends over half the path, and the windings of that half are protected by a plate (26, 27) which follows the contour of the windings such that the flow from the outside over the windings is guided from an outlet (17, 18) of the supply channel to the fan, and each steam outlet (22) is situated above or below the region of a winding near the outlet of the supply channel.

9. An oven according to claim 8, in which two supply channels are provided, each connected to its own fan (13, 14), each of which supply channels extends essentially symmetrically over half of the path, and both halves are protected by a protective plate (26, 27) such that each steam outlet (22) is situated above the region of a winding situated between the two outlets (17, 18) of the two supply channels.

10. An oven according to claim 1, comprising a housing with at least two zones (2, 3), each provided with means for supplying steam in connection with the setting of a cooking condition in the zone concerned, such as the temperature and/or relative humidity, and also a conveyor belt which passes through each of the zones and on which food products to be heated can be accommodated, which conveyor belt passes through at least one path with one or more windings above one another.

11. An oven according to claim 10, in which each zone has at least one fan (13, 14) for causing steam to circulate through that zone.

12. An oven according to claim 11, in which a partition (4) is situated between two adjacent zones, which partition has a passage for the conveyor belt.

13. An oven according to claim 12, in which the two zones are situated above each other.

14. An oven according to claim 12, in which the two zones are situated next to each other.

15. An oven according to claim 1, in which the path with a plurality of windings of the conveyor belt is helical.

16. An oven according to claim 15, in which each path is accommodated around a rotatable drum (9, 11).

* * * * *